United States Patent
Ikeda (10) Patent No.: US 8,130,418 B2
(45) Date of Patent: Mar. 6, 2012

(54) IMAGE PROCESSING APPARATUS AND IMAGE PROCESSING METHOD

(75) Inventor: Tohru Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 12/188,298

(22) Filed: Aug. 8, 2008

(65) Prior Publication Data

US 2009/0051976 A1    Feb. 26, 2009

(30) Foreign Application Priority Data

Aug. 20, 2007 (JP) ................. 2007-214046

(51) Int. Cl.
*H04N 1/409* (2006.01)
*G06K 15/00* (2006.01)

(52) U.S. Cl. ......... 358/3.26; 358/2.1; 382/199; 382/266

(58) Field of Classification Search ................. 358/3.26, 358/2.1, 3.01, 3.03, 3.13, 3.21; 382/199, 382/266, 162, 167; 250/226, 234
See application file for complete search history.

(56) References Cited

U.S. PATENT DOCUMENTS

| | | | |
|---|---|---|---|
| 5,221,970 A | 6/1993 | Sakamoto et al. | 358/444 |
| 5,327,250 A | 7/1994 | Ikeda | 358/401 |
| 5,359,435 A | 10/1994 | Hayashi et al. | 358/498 |
| 6,218,660 B1 * | 4/2001 | Hada | 250/226 |
| 2003/0090742 A1 | 5/2003 | Fukuda et al. | 358/448 |

FOREIGN PATENT DOCUMENTS

| | | |
|---|---|---|
| JP | 04-010766 A | 1/1992 |
| JP | 04-150167 A | 5/1992 |
| JP | 11-098363 A | 4/1999 |
| JP | 2003-101737 | 4/2003 |
| JP | 2003-189114 | 7/2003 |

* cited by examiner

*Primary Examiner* — Charlotte M Baker (74) *Attorney, Agent, or Firm* — Fitzpatrick, Cella, Harper & Scinto (57) ABSTRACT

The present invention provides an image processing apparatus having an image readout sensor that is provided with a plurality of pixels that optically read out an image, and a driving unit that moves the image readout sensor. The driving unit moves the image readout sensor, whereby the driving unit and the image readout sensor are controlled so that each of the plurality of pixels reads out a chart with a predetermined pattern. A feature amount of the plurality of pixels is calculated from the image data that has been read out by each pixel through the control, and MTF characteristics of the plurality of pixels are analyzed from the calculated feature amount. Then, nonuniformity of MTF characteristics of the plurality of pixels is corrected according to the analysis result.

9 Claims, 7 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, and relates to, for example, an image processing apparatus that reads an image at high resolution.

2. Description of the Related Art

Conventionally, in image processing apparatuses such as scanners and copy machines, a signal obtained by a sensor receiving light that is irradiated from a light source onto an original is input to an image processing circuit, and the image processing circuit performs signal processing such as filtering to generate a scanned image.

To perform high-definition image processing in an image processing apparatus such as these scanners and copy machines, uniform MTF (Modulation Transfer Function) characteristics are desirable. However, in an image processing apparatus represented by scanners and the like, the recent movements toward high resolution have made it more difficult to ensure the uniformity of MTF characteristics with high accuracy.

In particular, when mass-producing lenses used in high-resolution image processing apparatuses, there is a tradeoff with respect to accuracy and cost of the lens. For this reason, a certain increase in cost is inevitable in order to develop an image processing apparatus that is provided with MTF characteristics for all pixels. In the assembly process of an optical unit, MTF characteristics can partially deteriorate when fine dust adheres to a part of the optical unit in the light path. Although the assembly is performed in a clean room to prevent the optical unit from being contaminated with dust, advanced technologies and high cost are required in order to achieve a high-level prevention of dust contamination.

In the mature image processing apparatus market, these problems are attracting more and more attention. In other words, there is demand to achieve uniform MTF characteristics at a moderate cost.

To meet such a demand, technology related to a full-color image readout system that measures and corrects chromatic aberration of a readout image has been disclosed (see Japanese Patent Laid-Open No. 2003-189114). The chromatic aberration here is an optical characteristic, and is a physical phenomenon arising due a difference between the refractive index of a lens and the wavelength of light. For example, in a color scanner, when reading out an image through a lens, RGB (red, green, and blue) images need to be read out at different positions on an image pickup device due to chromatic aberration. If there are inconsistencies in assembly of the optical unit (such as the lens) within the image readout system, readout accuracy may suffer from instrumental errors due to displacement in RGB image read positions.

In addition, in image processing apparatuses such as scanners and copy machines, dust or dirt can adhere to a glass face or an orientation plate that reads out an image and cause deterioration in the quality of the image formed from the read image.

In order to prevent such deterioration in image quality, technology that detects the location of a portion of an image that is missing due to dust adherence or the like, and corrects the missing image portion by referring to surrounding normal image portions based on the detection results, has been disclosed (see Japanese Patent Laid-Open No. 2003-101737).

However, in Japanese Patent Laid-Open No. 2003-189114, although optical characteristics are corrected between the respective RGB channels, the MTF characteristics of the optical unit cannot be complemented so as to improve the readout accuracy of an image itself.

Meanwhile, in Japanese Patent Laid-Open No. 2003-101737, dust on a document plate can be detected. However, deterioration and the like in the MTF characteristics caused by dust within the light path, flaws in the optical unit, or the like cannot be detected.

SUMMARY OF THE INVENTION

Accordingly, the present invention has been conceived to solve one or more of the above-described problems, and provides an image processing apparatus and an image processing method that can create a high-quality image.

According to an aspect of the present invention, there is provided an image processing apparatus having an image readout sensor that is provided with a plurality of pixels that optically reads out an image, and a driving unit that moves the image readout sensor, the image processing apparatus comprising:

a control unit which controls the driving unit and the image readout sensor by causing the driving unit to move the image readout sensor so that each of the plurality of pixels reads out a chart that has a predetermined pattern;

a calculation unit which calculates a feature amount of the plurality of pixels from image data of each pixel that has been read out through the control performed by the control unit;

an analysis unit which analyses MTF characteristics of the plurality of pixels based on the feature amount calculated by the calculation unit; and a correction unit which corrects nonuniformity of the MTF characteristics of the plurality of pixels based on the result of the analysis performed by the analysis unit.

According to another aspect of the present invention, there is provided an image processing method for an image processing apparatus having an image readout sensor that is provided with a plurality of pixels that optically read out an image, and a driving unit that moves the image readout sensor, the image processing method comprising the steps of:

controlling the driving unit and the image readout sensor to cause the driving unit to move the image readout sensor so that each of the plurality of pixels reads out a chart that has a predetermined pattern;

calculating a feature amount of the plurality of pixels from image data of each pixel that has been read out through the control performed in the step of controlling;

analyzing MTF characteristics of the plurality of pixels based on the feature amount calculated in the step of calculating; and correcting nonuniformity of the MTF characteristics of the plurality of pixels based on the results of the analysis performed in the step of analyzing.

The present invention has an effect in that nonuniformity of MTF characteristics can be corrected easily at a low cost.

Further features of the present invention will become apparent from the following description of exemplary embodiments (with reference to the attached drawings).

DESCRIPTION OF THE EMBODIMENTS

Hereinafter, specific embodiments according to the present invention will be described in detail with reference to drawings.

[Configuration of Image Processing Apparatus]

Figure 1:
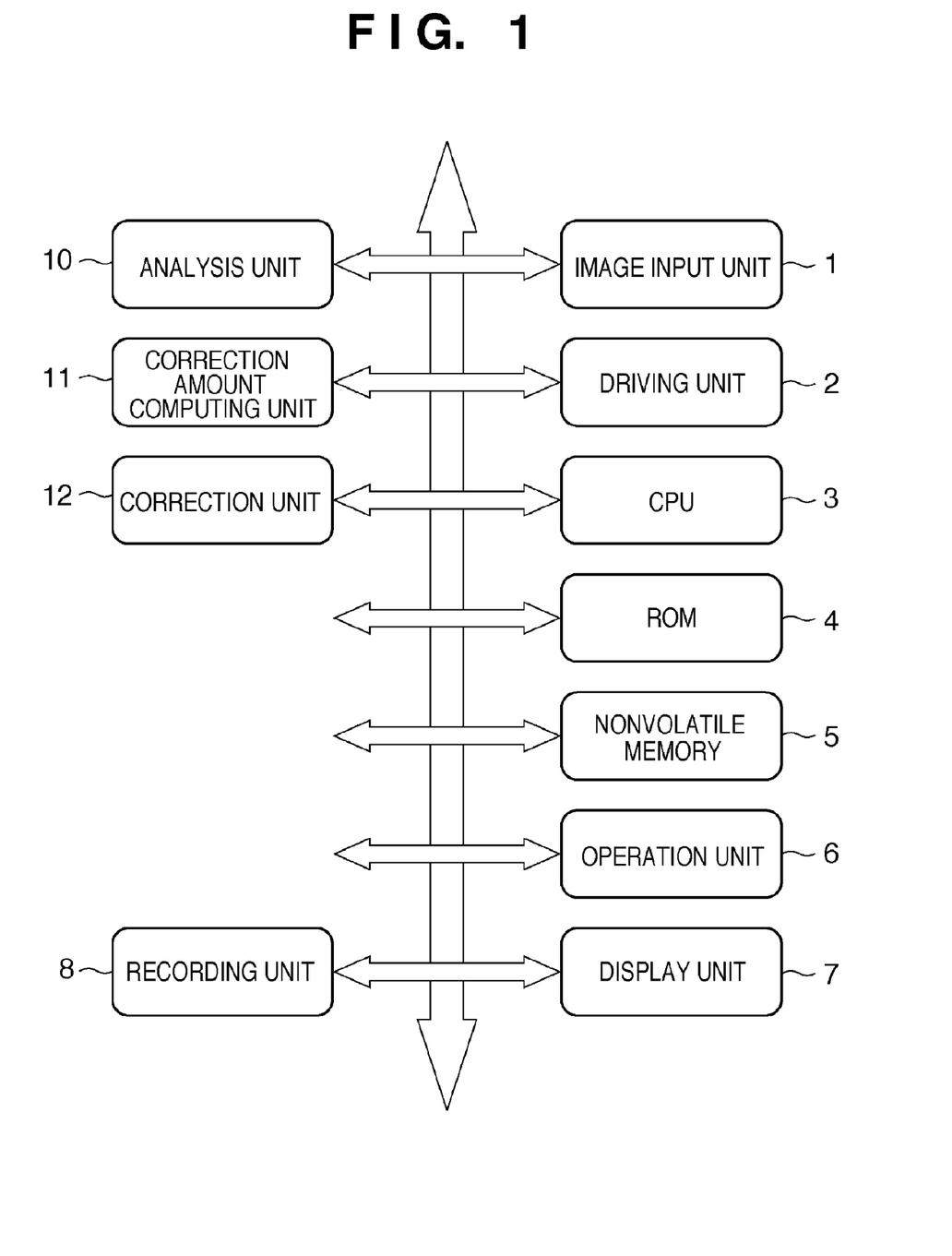
FIG. 1 is a block diagram illustrating an example of the configuration of an image processing apparatus embodying the present invention.

FIG. 1 is a block diagram illustrating an example of the configuration of an image processing apparatus embodying the present invention.

In FIG. 1, an image input unit 1 receives with a light receiving element (a pixel that optically reads out an image) the light irradiated from a light source as reflected light or transmitted light, and obtains multi-valued brightness data by performing photo-electric conversion. A driving unit 2 is configured of a stepping motor, a gear that transfers driving force of the stepping motor, a driver circuit that controls the stepping motor, and so on in the operation of the above-mentioned image input unit 1. When a line sensor that is disposed in a single direction is used, the direction parallel to the line sensor is called the main scanning direction, and the direction perpendicular to the line sensor is called the sub-scanning direction. In other words, the direction of movement of the image input unit 1 that is moved by the driving unit 2 corresponds to the sub-scanning direction.

A CPU 3 controls various functions provided to the image processing apparatus, and executes an image processing program that is stored in a ROM 4 in accordance with a predetermined operation performed by a user through an operation unit 6.

In addition, a nonvolatile memory 5 is a battery backed-up SRAM, rewritable ROM or the like, and stores data and the like that is specific to the image processing apparatus. For example, the nonvolatile memory 5 stores MTF characteristics data for each readout pixel, correction coefficients, and so on, which shall be described later.

In addition, the operation unit 6 is provided with a start key that is used when making a monochrome copy or a color copy, and when performing image scanning; a mode key for designation of modes for resolution, image quality, and so on; a stop key for suspension of operations; a numeric pad for input of the number of copies to make; and a register key. In addition, a selection key is provided for specifying and selecting a folder in which to store a scanned image, a name, and the file format. The CPU 3 detects the pressed state of these keys, and controls respective portions according to the detection results.

A display unit 7 is provided with a dot-matrix type liquid crystal display (LCD) portion and an LCD driver, and performs various displays in accordance with the control of the CPU3. The display unit 7 also displays thumbnails of scanned image data. A recording unit 8 is composed of an inkjet-type recording head or an electrophotographic printer, a control chip, and the like, reads out recorded data stored in the RAM, and prints out a hard copy in accordance with the control of the CPU 3.

An analysis unit 10 analyses MTF characteristics by analyzing the reproducibility of density variations plotted in a chart (described later) on a pixel-by-pixel basis using readout data of the chart and calculating the feature amount of each pixel.

A correction amount computing unit 11 uses the feature amount obtained in the analysis to compute a correction coefficient according to the feature amount.

A correction unit 12 includes a filter and a pixel replacement circuit, and corrects a readout image according to the correction coefficient obtained by the correction amount computing unit 11.

Figure 2:
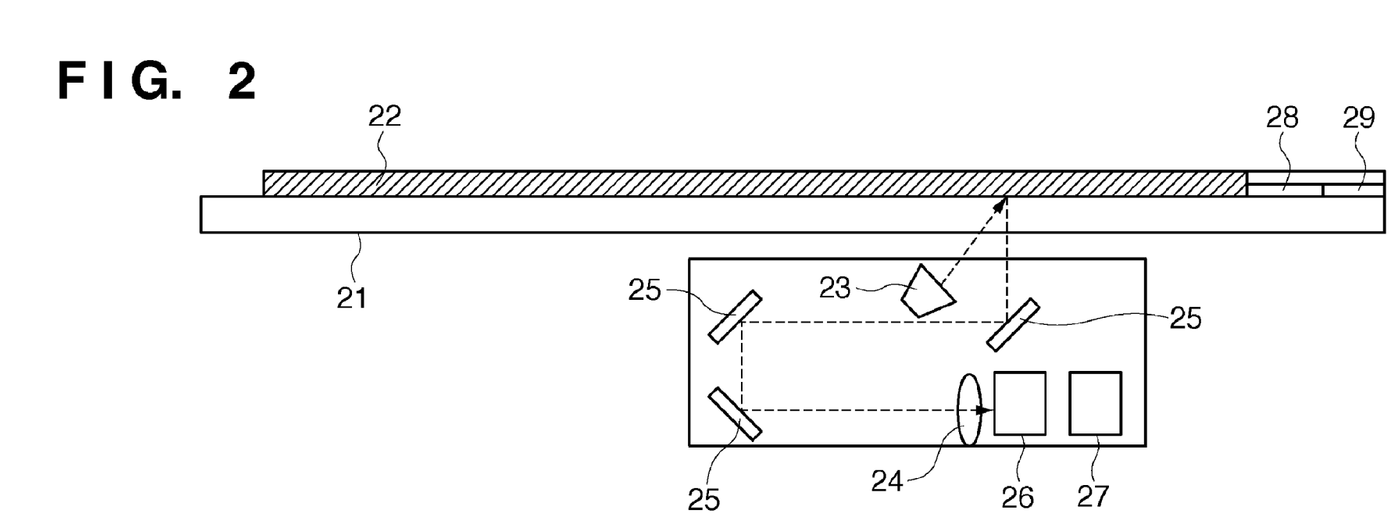
FIG. 2 is a diagram illustrating details of the example of the configuration of the image processing apparatus in FIG. 1.

FIG. 2 is a diagram illustrating details of the example of the configuration of the image processing apparatus in FIG. 1. Hereinafter, the image input unit 1 will be further explained.

The image processing apparatus in FIG. 2 has an optical unit that includes a light source 23 for irradiation of light to a readout original 22 placed on a glass document plate 21; a lens 24 that condenses light reflected and diffused by the readout original 22; and a mirror 25. The image processing apparatus is further provided with an image readout sensor (light receiving sensor) 26 that performs photo-electric conversion of the condensed light and an electric circuit 27 that includes an analog front end that converts an analog signal to a digital signal.

The glass document plate 21 is provided with an orientation plate 28 that is used for the later-described shading correction at the readout location thereof and a chart 29 in which a pattern for analysis of the MTF characteristics is written. If variations in the MTF characteristics are unlikely and if the chart 29 is used only for shipping inspections at the factory, the chart 29 for analysis of MTF characteristics can be used by placing it on the glass document plate 21.

The light receiving sensor 26 may be either a CCD type or a CMOS type. When reading out a color image, a color image can be obtained by using white light as the light source 23, by absorbing light of a certain wavelength with respective RGB filters, and then by performing photo-electric conversion with the light receiving sensor 26. A color image can be also obtained by sequentially illuminating a light source that has the wavelength of RGB and by performing photo-electric conversion with the light receiving sensor 26.

The optical unit is typically a CIS type (Contact image Sensor) optical unit that performs scanning by using a reduction optical unit that reduces an image with a lens and a light receiving sensor that is the same scale as the image size.

The optical unit that includes the light source 23, the lens 24, the mirror 25, the light receiving sensor 26, and the electric circuit 27 obtains image data as it is moved in the sub-scanning direction by the driving unit 2.

[Explanation of Scanning Operation]

Figure 3:
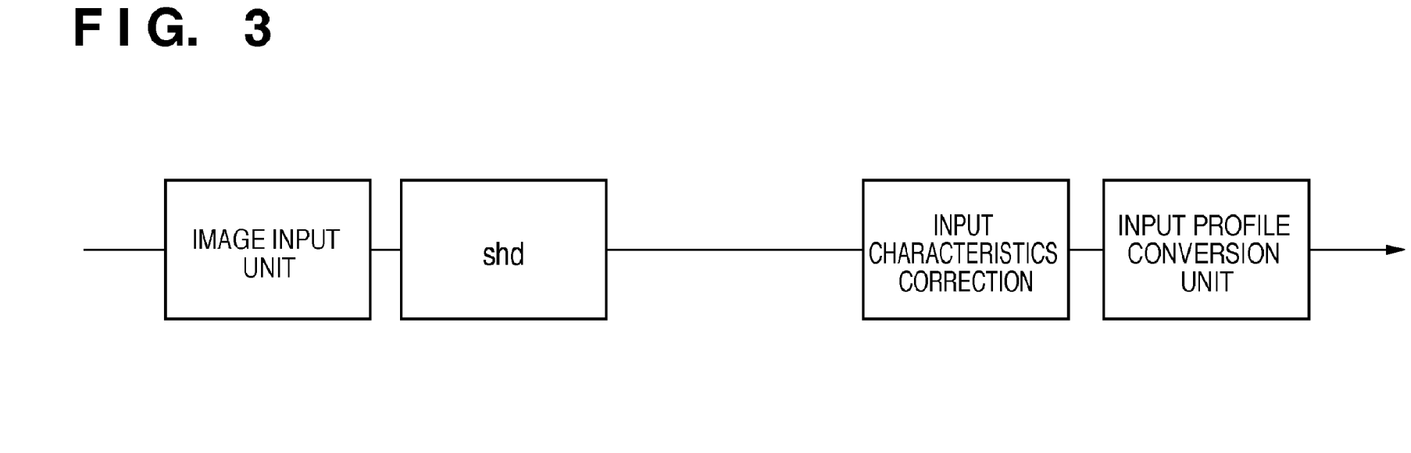
FIG. 3 is a diagram illustrating a scanning operation.

Hereafter, scanning operation will be explained using FIG. 3.

The image that is read out by the image input unit 1 normalizes the dynamic range for each pixel with shading correction (shd). Shading is a phenomenon in which a readout image becomes dark due to a reduced effective beam of light when an image is read out with an optical lens, such as when the light ray enters diagonal to the optical lens due to a part of the light ray being obscured by a lens frame or the like. Shading correction is a process for removing uneven density from a readout image that has uneven density due to shading. Furthermore, when a readout image is in color, the balance of the respective RGB outputs can be corrected.

If necessary, a unit for absorption of device-dependent characteristics performs a process for correcting the device-dependent characteristics (input characteristics), such as non-linearity of sensor output, on the data for which shading has been corrected.

Then, using an input profile conversion unit, the RGB signal obtained based on the spectral characteristics of a device are converted to standard color space with which image processing is performed.

[Explanation of Reduced Readout Accuracy of Readout Image]

When dust adheres to or a flaw is present on the imaging surface of a lens, a shadow or a line appears in the readout image. Meanwhile, it is hardly perceivable in the readout image when dust adheres to or a flaw is present on a mirror or a lens forming an optical unit that is located on the light path of the optical unit. However, since data to be subjected to image formation is missing due to blockage by dust or a flaw, the MTF characteristics are reduced. For example, if the MTF characteristics of some pixels in a line sensor are reduced, when an image that consists of fine lines or dots is read out, the readout image will include a line since the reproducibility of the dot image suffers from local deterioration.

Figure 4:
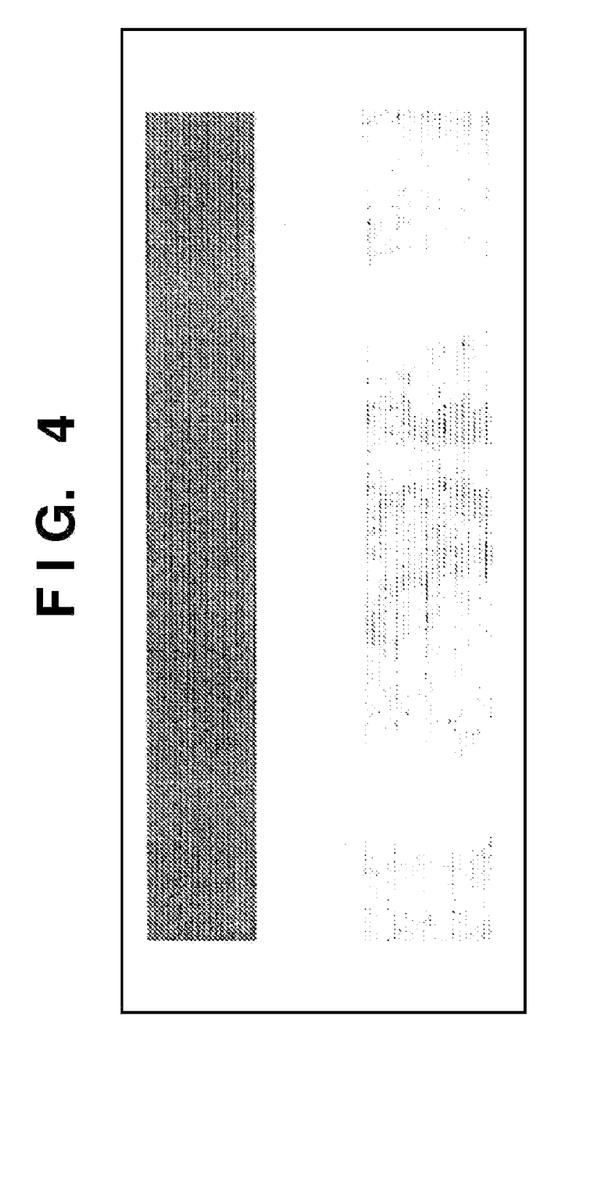
FIG. 4 is a diagram illustrating a situation in which readout accuracy of a readout image deteriorates.

FIG. 4 is a diagram of an example of such a case in which, in an image consisting of repetitive fine lines as shown in the upper portion of FIG. 4, when an image with fine lines is read out, thinning of the fine lines as shown in the lower portion of FIG. 4 can be perceived.

[Explanation of General Measuring Method of MTF Characteristics]

A method such as that described below is known as a general method for measuring MTF characteristics.

Figure 6:
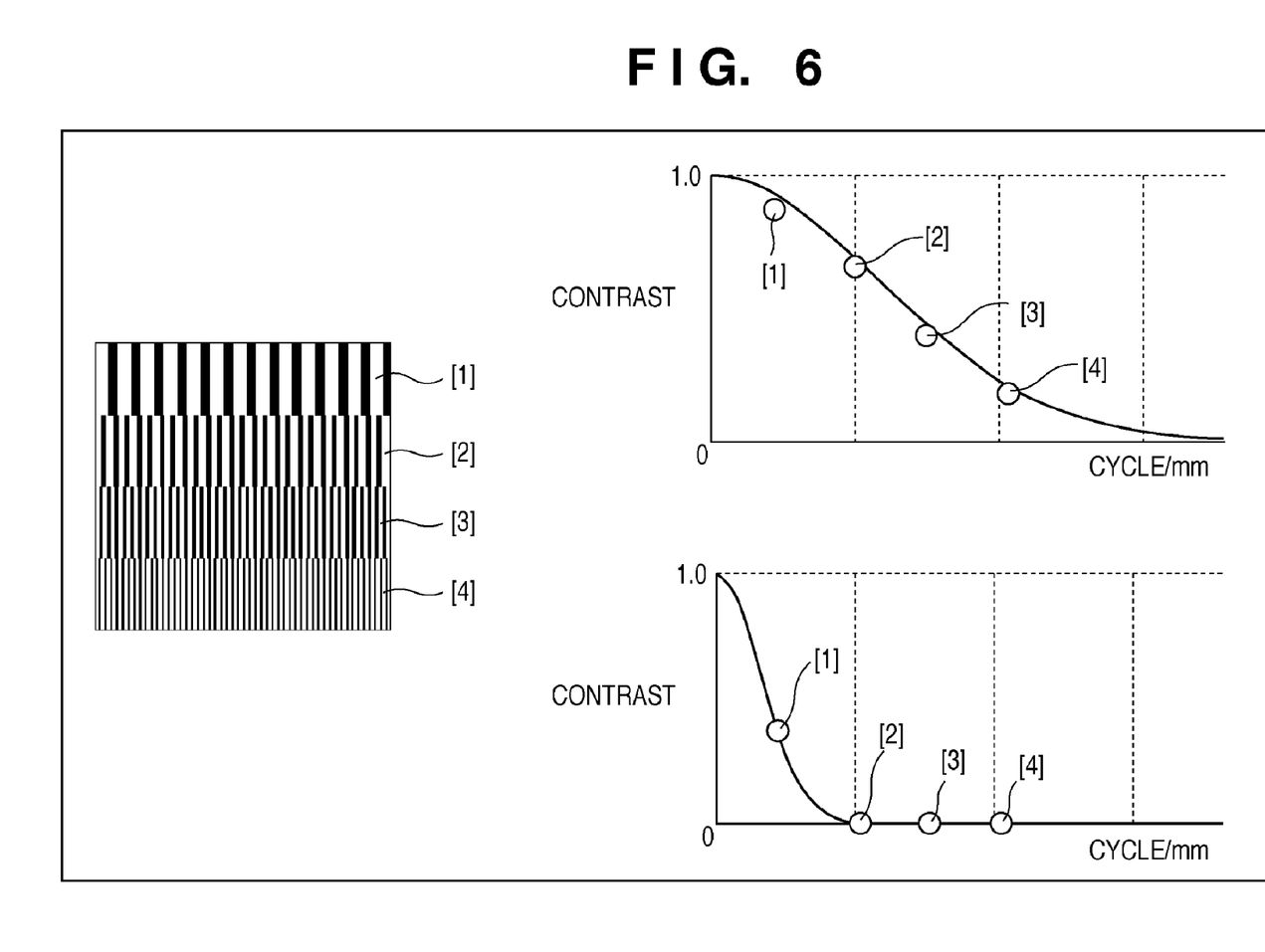
FIG. 6 is a diagram illustrating a general measuring method of MTF characteristics.

Transfer characteristics are obtained by scanning black and white fine lines with different repetitive frequencies as shown in the left portion of FIG. 6 based on the reproducibility of contrast of each of the different frequencies as shown in the upper right of FIG. 6 and the lower right of FIG. 6 obtained by scanning the black and white fine lines. Then, the MTF characteristics of the optical unit are obtained from the transfer characteristics.

However, in this method, although comprehensive MTF characteristics of a plurality of pixels in the main scanning direction can be obtained, local deterioration in MTF characteristics due to the adherence of dust and flaws is not detectable.

[Analysis Method of Local Variation in MTF Characteristics]

Hereafter, an example of a method for analyzing local MTF characteristics variations will be described using FIGS. 7A-7C and 8.

Figure 7A:
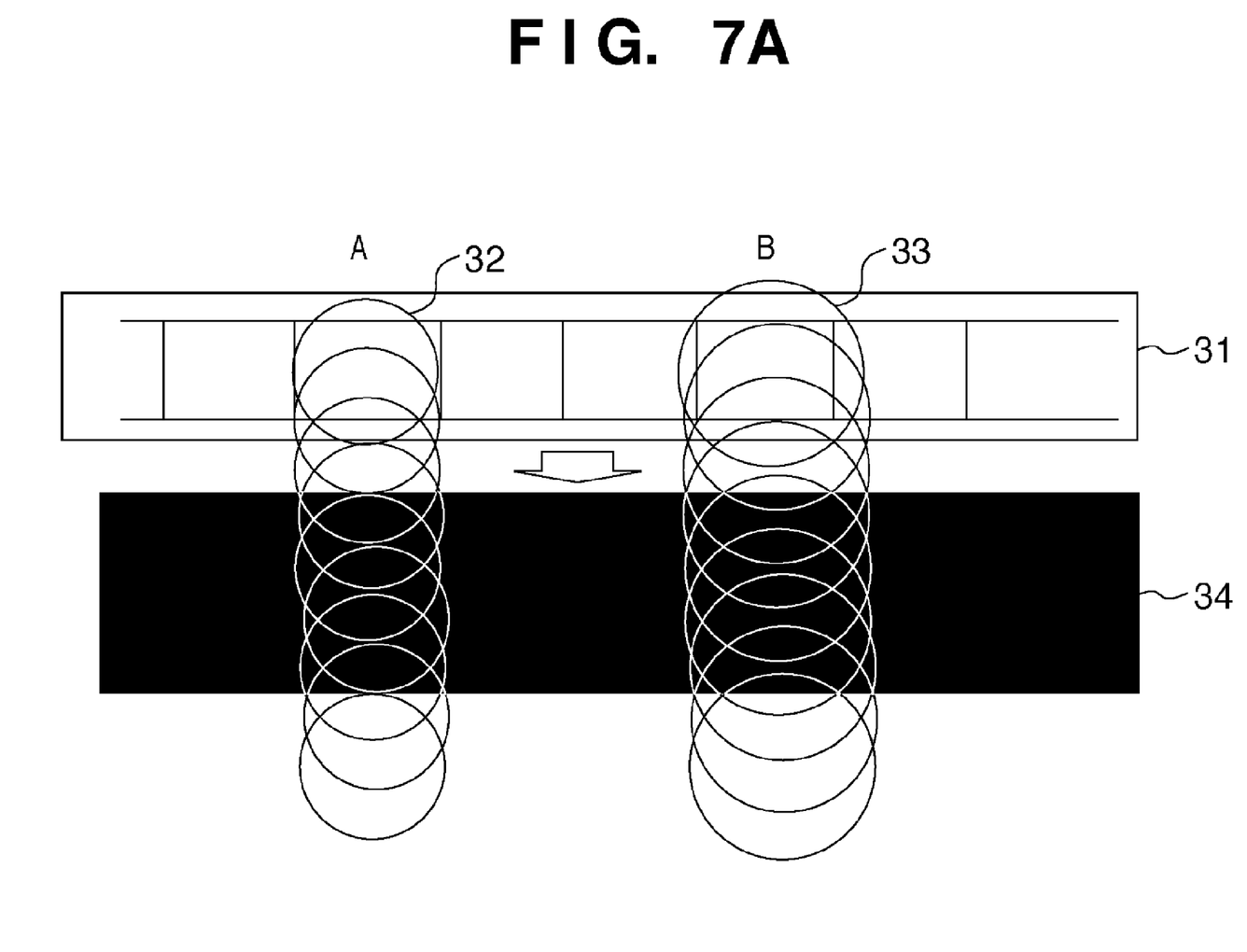
FIGS. 7A to 7C are diagrams illustrating a feature amount analysis according to the present invention.

In FIG. 7A, 31 represents a line sensor of the image input unit 1, and 32 and 33 represent a readout area of a pixel A and of a pixel B of the line sensor, in a schematic manner. The image input unit 1 moves in the sub-scanning direction, or in other words, in the direction of an arrow shown in FIG. 7A.

34 is an example of a chart that is used in the present invention, and consists of lines having a width the same as or more than the readout width of the line sensor 31 and that are recorded in the direction horizontal to the direction in which the plurality of pixels such as the pixel A and pixel B are disposed. In this embodiment, fine lines in the main scanning direction are used as a chart. The chart 34 may be installed within the apparatus (for example, as a glass original plate similar to a white orientation plate), or set on the glass original plate as an original similar to when scanning a regular original. Furthermore, the chart 34 may be a chart consisting of a plurality of recorded lines.

In general, it is often difficult to accurately keep the operation unit of a scanner and an original subject for detection disposed parallel to each other. In such a case, it is preferable to correct, for example, tilting of the original.

Figure 8:
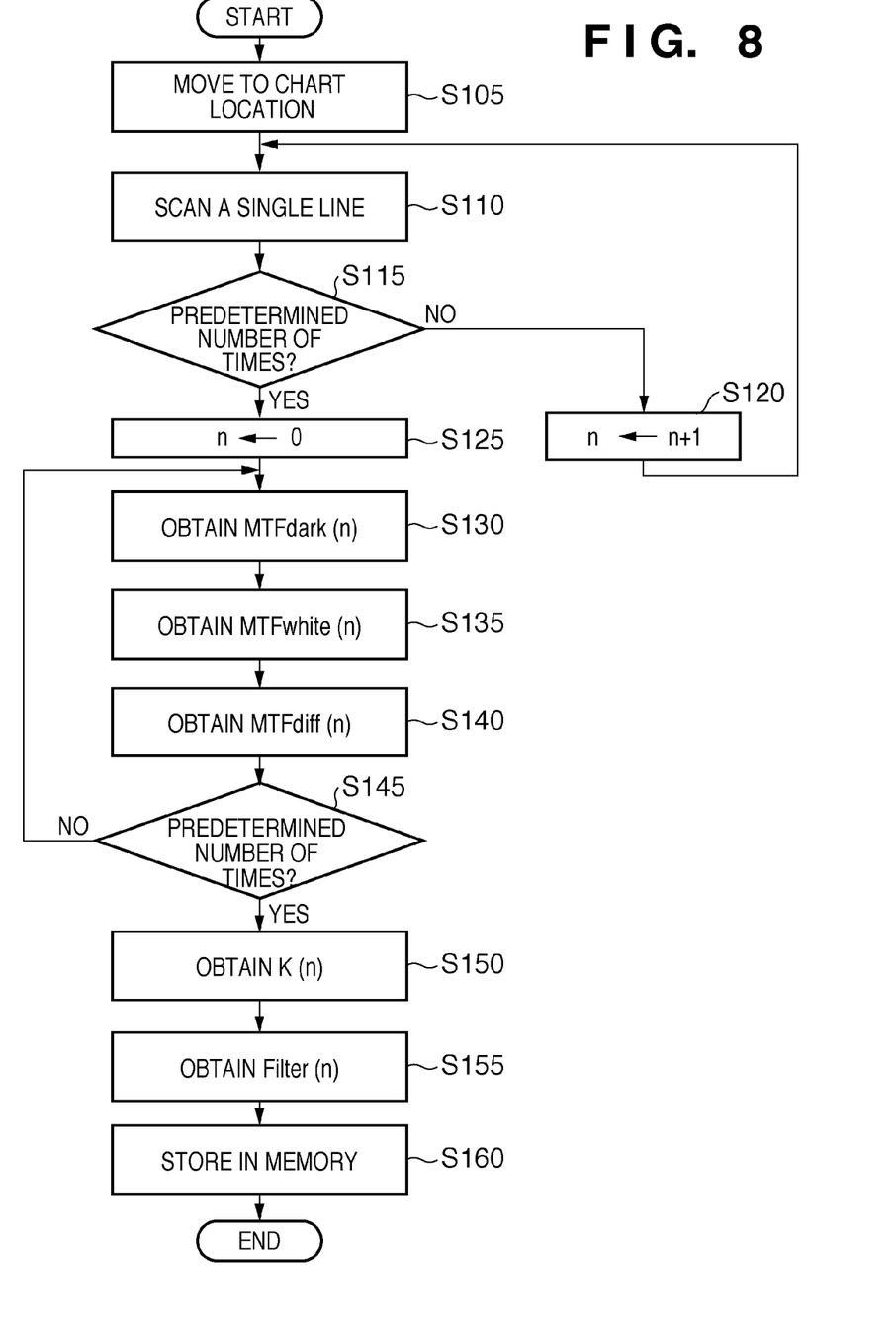
FIG. 8 is a flowchart illustrating an analysis method of local MTF characteristics variations according to the present invention.

Hereafter, the flow of an analysis method of local MTF characteristics variations will be described using FIG. 8.

First, in step S105, the image input unit 1 moves a pattern for MTF characteristics analysis to the scan location (chart location). Next, in step S110, the image input unit 1 scans a single line's worth of an image. Then, in step S115, a determination is made as to whether or not scanning of a single line's worth of the image has been performed a predetermined number of times. If scanning has not been performed for the predetermined number of times, step S120 is initiated, in which the driving unit 2 moves the image input unit 1 to the location for the next scan. Here, it is desirable that the amount of movement of the image input unit 1 has a resolution higher than the resolution in the main scanning direction. Then, steps S110 through S120 are repeated until the predetermined number of scans have been completed.

Figure 7B:
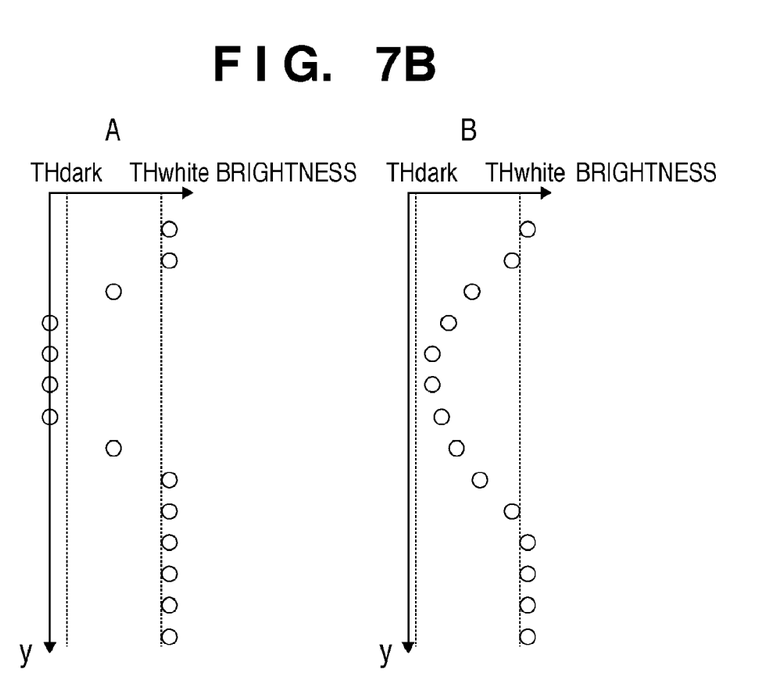
Figure 7C:
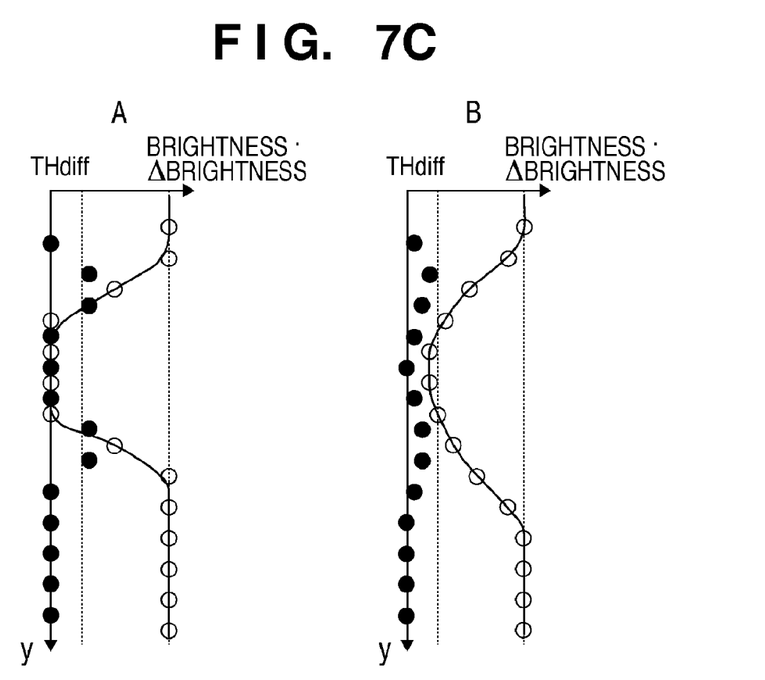

Next, a feature amount is analyzed for each pixel based on the image data obtained by scanning for the predetermined number of times. FIGS. 7B and 7C are examples of the image data that is read out at the pixel A and the pixel B by making the predetermined number of scans. It is assumed that the image data that is read out at the pixel A is the data that is read out by a pixel with high MTF characteristics, and the image data that is read out at the pixel B is the data that is read out by a pixel with low MTF characteristics. A symbol y in FIGS. 7B and 7C is the movement direction of the image input unit 1 that reads the image, or in other words, is the sub-scanning direction. The lateral axis in FIG. 7B indicates the brightness signal level, and the lateral axis in FIG. 7C indicates the brightness signal level and the amount of variations in the brightness.

Hereafter, two examples of a method for analyzing the feature amount will be described; however, the embodiment is not limited to these examples.

1. Method for Analyzing Feature Amount by Comparing Brightness Signal Value of Each Pixel with Threshold Value Data shown in FIG. 7B is the data when black fine lines are used. Exactly the same analysis can be performed with white lines, and both can also be used.

Among the brightness signals of the portion that is read out at a pixel n in the predetermined number of scans, the number of the brightness signals whose brightness signal value is at or below THdark, which is a first threshold, is represented as MTFdark (n). The number of brightness signals at or above the threshold THwhite, which is a second threshold, is represented as MTFwhite (n). MTFdark (n), which corresponds to the number of brightness signals at or below the first threshold value, and MTFwhite (n), which corresponds to the number of brightness signals at or above the second threshold, are the feature amount of the pixel n.

More specifically, MTFdark (n) and MTFwhite (n) are both low when a pixel has reduced MTF characteristics.

2. Method for Analyzing Feature Amount from Brightness Variations of Brightness Signals Data shown in FIG. 7C is the data when black fine lines are used. Exactly the same analysis can be performed with white lines, and both can also be used.

Brightness variations of brightness signals of the pixel n are obtained by differentiating brightness signal data such as that shown in FIG. 7B. Black dots in FIG. 7C represent the brightness variations. The maximum value of the brightness variation is represented as MTFdiff (n). The MTFdiff (n) is the feature amount of the pixel n.

More specifically, MTFdiff (n) is low when a pixel has reduced MTF characteristics.

Returning again to FIG. 8 for explanation of the feature amount analysis flow, in step S125, n is cleared. Then, in steps S130, S135 and S140, MTFdark (n), MTFwhite (n), and MTFdiff (n), respectively, are obtained. Next, in step S145, the steps S130 through S145 are repeated for a predetermined number of times that corresponds to the number of sensor pixels.

Next, in step S150, a correction coefficient is obtained from the feature amount obtained in the above-described flow. Here, an example is shown in which the method that uses the threshold is combined with a tilt-based method.

Here, assume that $$k(n)=f(\text{MTFdark}(n),\text{MTFwhite}(n),\text{MTFdiff}(n))$$

When an image, which is an original, is scanned, scanning is performed by applying a filter that has been generated based on the correction coefficient. The filter that has been generated in advance based on the correction coefficient may be stored in a memory to improve the processing speed during correction.

The filter generated based on the correction coefficient is generated so that brightness variations become as close as possible between pixels. Nonuniformity in MTF characteristics of each pixel can be corrected by increasing and decreasing brightness variations by applying the filter. For example, a pixel with reduced MTF characteristics can be corrected so as to enhance edges by increasing brightness variations. Meanwhile, a pixel with good MTF characteristics can be corrected so as to blur edges by decreasing brightness variations.

In this embodiment, the following correction coefficient that continuously varies around pixels with a large variation in k(n) is further obtained to make lines less perceivable in an image, and to minimize deterioration in image quality.

$$K(n)=F(dk(n-i)/d(n-1), \ldots, dk(n)/dn, \ldots dk(n+i)/d(n+i))$$

Then, in step S155, a filter Filter (n) is obtained from the correction coefficient K (n).

Next, in step S160, the correction coefficient for a single line as obtained above, or the filter generated based on the correction coefficient, is stored in memory.

[Explanation of Correction]

Figure 5:
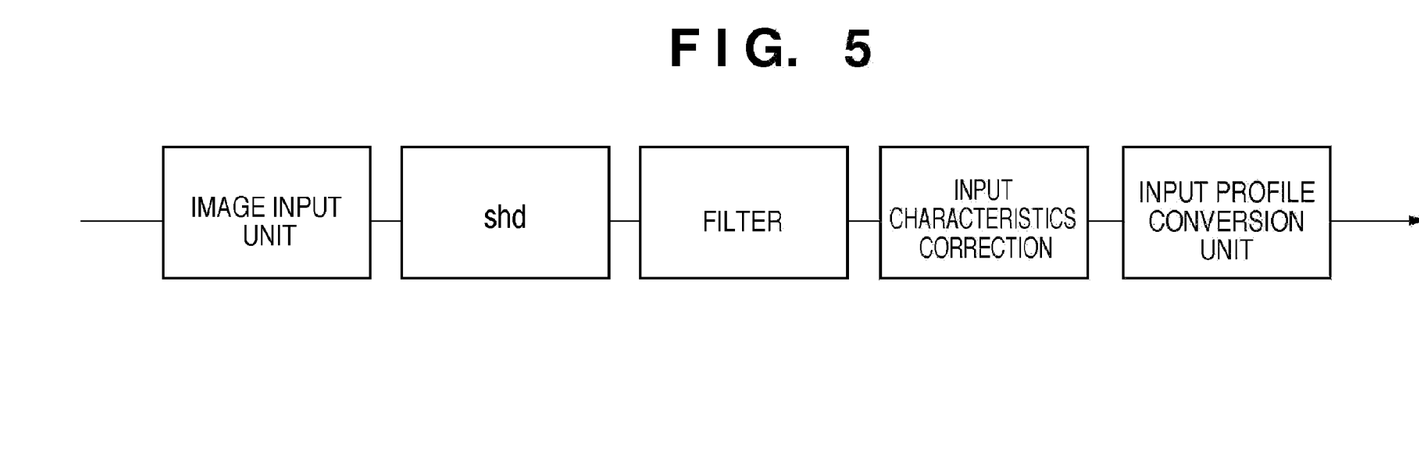
FIG. 5 is a diagram illustrating a scanning operation in which input characteristics are corrected by a correction filter.

A filter is generated based on the correction coefficient for a single line that has been generated through the above-described method and stored in a memory. As shown in FIG. 5, input characteristics are corrected by applying the filter generated in this manner.

Other Embodiments

Although above details are explained with reference to an image processing apparatus in which a driving unit moves a line sensor that is provided with a plurality of pixels disposed in a certain direction that is perpendicular to the direction the plurality of pixels are disposed, as an example, the present invention can also be applied to an image processing apparatus that is provided with an area sensor. In other words, the MTF characteristics of each pixel of the area sensor can be detected by calculating feature amounts in the respective directions x and y by moving the area sensor in two different directions that are perpendicular to each other (direction x and direction y).

The present invention can be similarly applied when transmitted light is used, such as, for example, in film scanner.

The present invention can be applied to a system that consists of a plurality of apparatuses (such as host computer, interface device, reader and printer) as well as to a device that consists of a single apparatus (such as copy machine and facsimile machine).

Furthermore, in a device inspection process, a system may be employed whereby part or all of the feature amount analysis according to the present invention is performed on a PC, and the correction processing only is performed by the apparatus. This makes it possible to reduce the cost and improve processing speed, since the processing required for the feature amount analysis can be executed external to the device.

A feature of the present invention can also be accomplished by reading out and running a program from a storage media in which a software program that a computer (or CPU or MPU) of a system or of a device actualizes a function in an embodiment described above is stored. In this case, the program itself that is read out from the storage media realizes the functionality of an embodiment described above, and the storage media in which the program is stored constitutes the present invention. In addition, realization of the functionality of the embodiment described above in which a part or all of the actual processing is performed in accordance with a command of the program that has been stored in a storage media by an operating system (OS) or the like that is running on a computer is also included in the present invention.

Furthermore, realization of the functionality of the embodiment described above under the instruction of a program in which the program that has been read out from a storage media is written into a memory of a function expansion card inserted in the computer or a function expansion unit connected to the computer is also included in the present invention.

When the present invention is applied to the storage media, a program that corresponds to the flow chart described above is to be stored in the storage media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-214046, filed on Aug. 20, 2007, which is hereby incorporated by reference herein in its entirety.

What is claimed is:

1. An image processing apparatus having an image readout sensor with a plurality of pixels that optically reads out an image, and a driving unit that moves the image readout sensor, the image processing apparatus comprising:
   a control unit which controls the driving unit and the image readout sensor by causing the driving unit to move the image readout sensor such that each of the plurality of pixels reads out a chart that has a predetermined pattern;
   a calculation unit which calculates a feature amount of each of the plurality of pixels from the chart that has been read out through the control performed by said control unit;
   an analysis unit which analyses MTF characteristics of each of the plurality of pixels based on the feature amount calculated by said calculation unit; and
   a correction unit which corrects nonuniformity of the MTF characteristics of the plurality of pixels based on the results of the analysis performed by said analysis unit,
   wherein said calculation unit calculates, for each of the plurality of pixels, a maximum brightness variation as the feature amount.

2. The image processing apparatus according to claim 1, wherein said correction unit performs correction for a pixel with high MTF characteristics among the plurality of pixels, in the results of the analysis performed by said analysis unit, so as to blur an edge by applying a filter to reduce brightness variations.

3. The image processing apparatus according to claim 1, wherein said correction unit performs a correction for a pixel with low MTF characteristics among the plurality of pixels, in the results of the analysis performed by said analysis unit, so as to enhance an edge by applying a filter to increase brightness variations.

4. The image processing apparatus according to claim 1, wherein
the image readout sensor is a line sensor in which the plurality of pixels are disposed in a certain direction, and
the driving unit moves the image readout sensor in a direction perpendicular to the direction in which the plurality of pixels are disposed.

5. The image processing apparatus according to claim 4, wherein the pattern has a plurality of lines recorded in a direction horizontal to the direction in which the plurality of pixels are disposed, the lines having a width that is the same as or more than the readout width of the image readout sensor.

6. The image processing apparatus according to claim 1, wherein said calculation unit calculates, for each of the plurality of pixels, a number of brightness signals in the chart that have a brightness at or below a predetermined first threshold and a number of brightness signals in the chart that have a brightness at or above a predetermined second threshold, the second threshold being higher than the first threshold, as the feature amount.

7. An image processing apparatus having an image readout sensor with a plurality of pixels that optically reads out an image, and a driving unit that moves the image readout sensor, the image processing apparatus comprising:
a control unit which controls the driving unit and the image readout sensor by causing the driving unit to move the image readout sensor such that each of the plurality of pixels reads out a chart that has a predetermined pattern;
a calculation unit which calculates a feature amount of each of the plurality of pixels from the chart that has been read out through the control performed by said control unit;
an analysis unit which analyses MTF characteristics of each of the plurality of pixels based on the feature amount calculated by said calculation unit; and
a correction unit which corrects nonuniformity of the MTF characteristics of the plurality of pixels based on the results of the analysis performed by said analysis unit,
wherein the calculation unit calculates, for each of the plurality of pixels, a number of brightness signals in the chart that have a brightness at or below a predetermined first threshold and a number of brightness signals in the chart that have a brightness at or above a predetermined second threshold, the second threshold being higher than the first threshold, as the feature amount.

8. An image processing method for an image processing apparatus having an image readout sensor with a plurality of pixels that optically reads out an image, and a driving unit that moves the image readout sensor, the image processing method comprising the steps of:
controlling the driving unit and the image readout sensor to cause the driving unit to move the image readout sensor such that each of the plurality of pixels reads out a chart that has a predetermined pattern;
calculating a feature amount of each of the plurality of pixels from the chart that has been read out through the control performed in said controlling step;
analyzing MTF characteristics of each of the plurality of pixels based on the feature amount calculated in the said calculating step; and
correcting nonuniformity of the MTF characteristics of the plurality of pixels based on the results of the analysis performed in said analyzing step,
wherein the calculating step includes calculating a maximum brightness variation as the feature amount.

9. A non-transitory computer-readable storage medium storing a program for causing a computer to perform the steps of the image processing method according to claim 8.

* * * * *